R. KLEIN.
PHOTOGRAPHIC SHUTTER.
APPLICATION FILED AUG. 11, 1921.
1,425,980.
Patented Aug. 15, 1922.
2 SHEETS—SHEET 1.
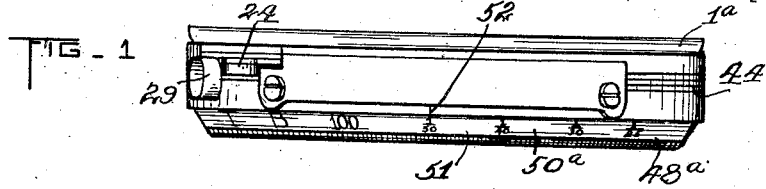
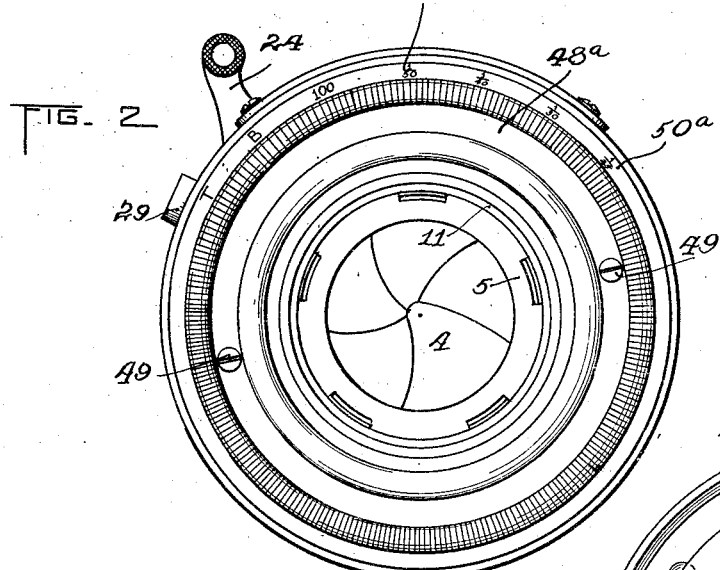
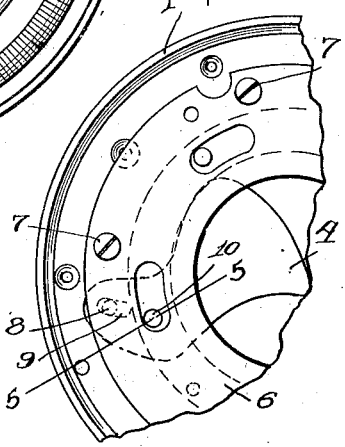
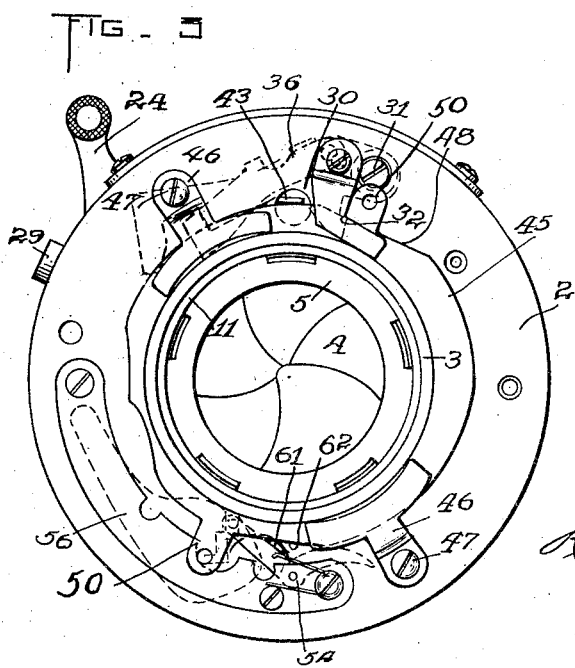
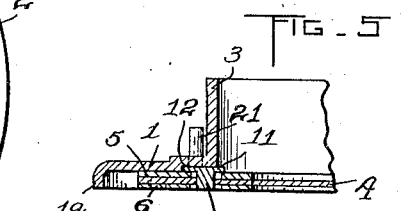
INVENTOR.
Rudolph Klein
BY
his ATTORNEYS.

R. KLEIN.
PHOTOGRAPHIC SHUTTER.
APPLICATION FILED AUG. 11, 1921.
1,425,980.
Patented Aug. 15, 1922.
2 SHEETS—SHEET 2.
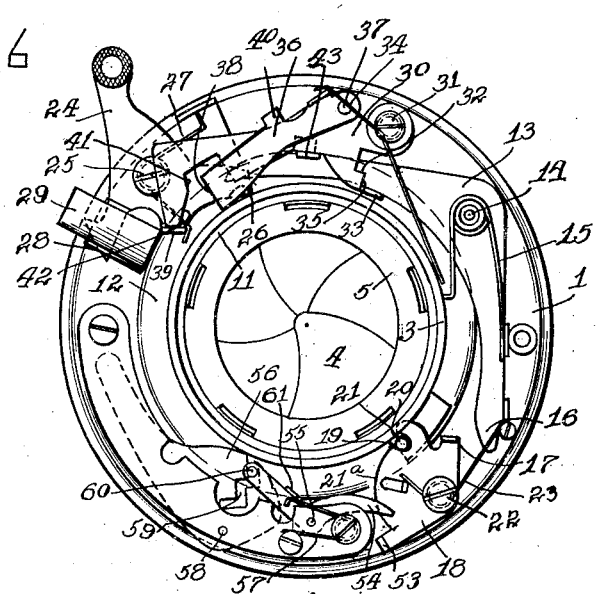
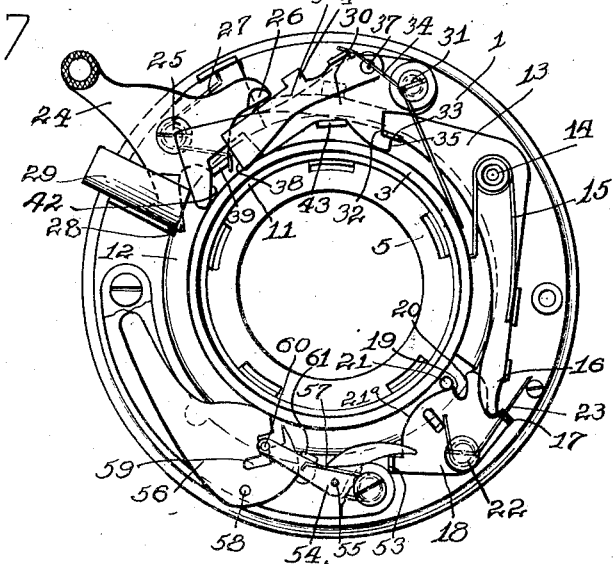

UNITED STATES PATENT OFFICE.

RUDOLPH KLEIN, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

1,425,980.  Specification of Letters Patent.  Patented Aug. 15, 1922.

Application filed August 11, 1921. Serial No. 491,405.

*To all whom it may concern:*

Be it known that I, RUDOLPH KLEIN, a citizen of the United States, and resident of Rochester, in the county of Monroe and State of New York, have invented certain new and useful Improvements in Photographic Shutters, of which the following is a specification.

The present invention relates to photographic shutters and more particularly to the type in which the retarding mechanism is employed for delaying the action of the shutter blades in order to obtain the so-called timed instantaneous exposures, an object of this invention being to provide an improved retarding mechanism which will not be materially affected by dust, changes in temperature, or different positions of the camera. Another object of the invention is to provide a durable and inexpensive retarding device employing a minimum number of parts.

To these and other ends, the invention consists of certain parts and combinations of parts all of which will be hereinafter described, the novel features being pointed out in the appended claims.

In the drawings:

Fig. 1 is an edge view of a photographic shutter constructed in accordance with this invention;

Fig. 2 is a front view of the shutter;

Fig. 3 shows the shutter with the front cover and adjusting member removed;

Fig. 4 is a fragmentary view of the rear portion of the shutter;

Fig. 5 is a detail section on the line 5—5, Fig. 4;

Fig. 6 shows the interior of the shutter with the blades in closed positions;

Fig. 7 is a view similar to Fig. 6 showing the shutter parts adjusted for open positions of the blades: and Fig. 8 is an edge view looking in the direction of the arrow A in Fig. 7.

The invention is herein shown as embodied in a shutter constructed similarly to that illustrated in an application filed by me on even date herewith Serial No. 491,404. In this shutter there is provided a casing formed of two members 1 and 2. The casing member 1 is in the form of an annular plate having a peripheral flange 1ª on one side and an annular flange 3 projecting from the opposite side about the central opening and forming with the lens tube. The shutter blades 4 are mounted on one side of the member 1 within the chamber formed by the flange 1ª. In this instance, the blades are pivotally mounted between two annular plates 5 and 6 secured in spaced relation by screws 7, pivot lugs 8 being provided on one of the plates for engaging in slots 9 in the blades 4, the blades also being pivotally mounted on pins 10 projecting from an operating ring 11 which lies in a depressed portion 12 in the member 1 about the central opening.

The shutter operating mechanism embodies a master lever 13 pivoted at 14 and moved in one direction under the action of the spring 15. This master member or lever 13 has one end 16 adapted to cooperate with a projection 17 on the exposure lever 18, this exposure lever being formed with two surfaces 19 and 20, the former of which cooperates with a pin 21 to effect the movement of the shutter ring 11 in one direction, and the latter surface 20 cooperating with the pin 21 to effect the movement of the shutter exposure ring 11 in the other direction. The exposure lever 18 also has a surface 21ª concentric with the pivot 22 of the exposure lever 18 to cooperate with the pin 21 for the purpose of holding the shutter blades open while the exposure lever 18 is being shifted to the end of its movement by the master member 13. When the end 16 of the master member passes off the end 17, the exposure lever is returned to normal position, shown in Fig. 6, under the action of the spring 23. When the master member is moved to store energy in the spring 15, by means such as that hereinafter described, the end 16 which is flexible rides over the shoulder 17, which is bevelled or inclined, and does not effect any movement in the exposure lever 18.

Movement of the master member 13 against the action of its spring 15 may be obtained in any suitable manner. In this instance, there is provided an actuating lever 24 which has an arm extending to the exterior of the casing and is pivoted at 25 within the casing. This actuating lever also has a projection 26 which is adapted to cooperate with the adjacent end of the master lever 13 to move the master lever against the action of the spring 15, the projection 26 being bevelled so that, when the actuating lever returns under the action of its spring 27, the actuating lever will not produce any movement in the master lever. The actuating lever may also be operated through its arm 28 which may be operated upon by any suitable device operating in the tube 29. It is apparent that as the actuating arm 24 and the master lever 13 move about two different centers, there will come a time when the actuating lever will free the master member to the action of its spring 15 and then the master member will act upon the projection 17 of the exposure lever 18 to shift the exposure lever for the purpose of effecting the opening and the closing of the shutter blades 4.

Shutters of this type are usually provided with detaining means for holding the shutter blades open. In this instance, this detaining means is in the form of a detent 30 pivoted at 31 and having a shoulder 32 movable in the path of a projection 33 on the master lever 13 before it has completed its movement under the action of the spring 15, and after it is moved sufficiently to effect the opening movement of the shutter blades. A spring 34 acts on the detent to move the shoulder 32 into the path of the projection 33, and in order that the detent may be held away from the detaining position the detent is provided with a surface 35 which cooperates with the projection 33, in the manner shown in Fig. 6, so that when the master member is in normal position the detent will be held by the projection 33, with energy stored in its spring, ready to shift the shoulder 32 into the path of the projection 33.

With the end in view of shifting the detent 30 out of the path of the master member, when the parts are in the positions shown in Fig. 7, the detent has a latch 36 pivoted thereon at 37, and this latch has an end 38 which, when the shutter blades are open, lies in proximity to a lateral projection 39 on the actuating lever 24, so that when the actuating lever is depressed, this projection 39 will engage the latch 36 and shift the detent 30. To prevent this latch interfering with the movement of the actuating lever 24 on the initial movement of said lever to shift the master member 13, the master member 13 engages with a lateral projection 40 on the latch and swings the latch on its pivot 37 out of the path of the projection 39 when the master member is being shifted by the actuating lever 24. It is desirable that the actuating lever shall not return to its normal position under the action of the spring 27, while the master member 13 is held by the shoulder 32, and to this end the detent 30 is provided with a surface 41, which will engage with a projection 39 and prevent its return with the actuating lever holding the latter in a position to engage a surface 38 on the latch 36.

Should it be desired to hold the shutter blades open for a period of time, only so long as the actuating lever 24 is depressed to give what is known as a "bulb" exposure, the detent 30 is controlled in such a manner that, while the shoulder 32 will pass into the path of the projection 33 on the master member, the shoulder 41 will not be engaged by the projection 39 but instead the projection 39 will cooperate with an inclined or bevelled surface 42 on the actuating lever when the latter is released, and, as a consequence, the detent 30 will be shifted by the actuating lever to carry the shoulder 32 out of the path of the projection 33. The detent 30 may be so held that the shoulder 32 will not, under any condition, pass into the path of the projection 33, in order to give the so-called "instantaneous" exposures.

This control of the exposures for time, bulb and instantaneous exposures may be effected through a projection 43 on the detent 30, this projection being controlled in a manner now to be described. The casing member 2 has a peripheral flange 44 which forms the side wall of the casing and abuts the casing member 1 to enclose the shutter operating mechanism. The casing member 2 fits about the lens tube 3 so that the latter projects beyond the same, and on this projecting portion a controlling member or ring 45 turns, this ring being held to the outer face of the member 2 by spring clips 46 overhanging the ring and secured to the casing member 2 by screws 47. This controlling member 45 has a surface 48 which cooperates with the projection 43 and determines whether the shutter shall operate for time, bulb or instantaneous exposures. The front face of the casing member 2 as well as the controlling member 45 may be covered by a combined cover and adjusting member 48a which is secured by screws 49 to lugs 50 on the controlling ring 45. It is apparent that the turning of this combined cover and adjusting member 48a will effect the adjustment of the controlling ring 45. In order to determine such adjustment, the adjusting member 48a is bevelled at 50a, and on this bevelled portion indicating matter 51 is arranged for cooperation with an index 52 formed on the periphery of the casing.

The foregoing parts are not claimed per se in this application, the feature of this application being the retarding mechanism which will retard the action of the blades for different periods of time so as to obtain graded instantaneous exposures. This retarding mechanism may cooperate with any part of a shutter which will produce a retarding of the closing of the shutter blades. In the illustrated embodiment the retarding mechanism cooperates with the exposure lever 18 after the latter connects with the master lever 13 and after the blades have been opened. In this instance, the exposure lever 18 has a projection 53 with which a pressure receiving member 54 cooperates. This pressure receiving member is in the form of a two arm lever pivoted at 55, one arm engaging the exposure lever projection 53 and the other arm cooperating with the retarding device 56. A spring 57 acts on this oscillatory pressure receiving member 54 and moves its end toward the exposure lever projection 53, the pressure receiving member 54 being moved in the opposite direction by the exposure lever 18 while the latter is being shifted by the master member 13. The retarding device 56 is in the form of a movable body, preferably pivoted at 58, and being extended laterally to one side of its pivot in order to provide a weight which will resist the swinging of the retarding device about its pivot. The connection between the pressure receiving device 54 and the retarding device 56 is in the form of an irregular way 59 preferably made by providing a saw tooth or zigzag slot in the retarding device 56 for engagement by a pin or projection 60 arranged eccentrically on the pressure receiving device 54, this connection or saw tooth way being arranged so that it extends outwardly with reference to the pivot 58. When the retarding mechanism is in a position to retard the movement of the exposure member 18, as shown in Fig. 6, the projection 60 lies at the outer end of the way and, when the projection 53 of the exposure lever engages the pressure receiving member 54, the projection or pin 60 is moved inwardly on the way. In moving inwardly the projection contacts with the walls of the way and produces a vibration of the retarding device 56. The energy required to produce this vibration is sufficient to impose a retarding action on the exposure lever 18.

For the purpose of varying the retarding action, the pressure receiving member may be adjustable with reference to the part with which it cooperates, in this instance, the exposure lever 18, and to this end the pressure receiving member has a lateral projection 61 which is adapted to cooperate with the cam surface 62 on the controlling member 45, the cam surface being so formed that it shifts the pressure receiving member with reference to the exposure lever 18 and, at the same time, shifts the pin 60 in the irregular way of the retarding device 56. The nearer to the pivot 58 the pin 60 lies, the less the retarding action. It is possible to so shift the pressure receiving member 54 that the shutter may open and close without any engagement taking place between the exposure lever 18 and the pressure receiving member 54. This occurs when it is desired to obtain an exposure without any retarding action or when "bulb" or "time" exposures are desired.

Assuming that the parts are in the positions shown in Fig. 6 and the shutter is adjusted for instantaneous exposures, the pressure on the actuating lever 24 will shift the master member 13 to cause the latter to pass behind the projection 17 of the exposure lever 18, and thereafter the master member 13 will be released by the actuating lever 24 and be moved in the opposite direction under the spring 15, moving under the action of the spring to shift the exposure lever 18 to open the shutter blades. About or after the time that the shutter blades are opened, the exposure lever 18 will cooperate with the pressure receiving member 54 and swing the latter against its spring 57, causing the pin 60 to pass in the irregular way 59 in the retarding device 56. This retarding action continues until the master lever slips off the exposure lever 18, and the latter returns under the action of its spring 23, and the pressure receiving device 54 returns under the action of its spring 57. The turning of the controlling ring 45 will vary the position of the pressure receiving member 54 with reference to the projection 53 of the exposure lever 18, and in this way the duration of the retarding action may be controlled, or the retarding action of the retarding device may be completely eliminated.

From the foregoing it will be seen that there has been provided a novel retarding mechanism having a movable and preferably pivoted retarding device provided with an irregular way preferably of saw tooth form, extending outwardly from the pivot of the retarding device and having a portion of an oscillatory pressure receiving member operating therein, the pressure receiving member being arranged to cooperate with a part of the shutter operating mechanism to impose a retarding action on the closing of the shutter blades. This pressure device is adjustable with reference to the shutter mechanism so as to vary the duration of the retarding action or to completely eliminate the retarding action.

What I claim as my invention and desire to secure by Letters Patent is:—

1. In a photographic shutter, shutter blades, an operating mechanism for the shutter blades, and a retarding mechanism arranged for cooperation with said operating mechanism and embodying a pressure receiving member arranged to receive pressure from the operating mechanism and a movable retarding device, one of said parts being provided with an irregular way in which a portion of the other part operates to effect the movement of said retarding device for the purpose of resisting the movement of the pressure receiving member.

2. In a photographic shutter, shutter blades, an operating mechanism for the shutter blades, a retarding mechanism for retarding the closing of the blades comprising an oscillatory pressure receiving device arranged to cooperate with the portion of the operating mechanism, a vibrating retarding device, and a connection between the retarding device and the pressure receiving device embodying a way on one of said parts and a portion on the other of said parts operating in said way for the purpose of vibrating the retarding device to impose a resistance to the movement of the pressure receiving device.

3. In a photographic shutter, shutter blades, an operating mechanism for the shutter blades, a retarding mechanism arranged for cooperation with the operating mechanism comprising a pivotally mounted retarding device having a zigzag way thereon, and an oscillatory pressure receiving device arranged to receive pressure from the operating mechanism and having a portion operating in said zigzag way.

4. In a photographic shutter, shutter blades, an operating mechanism for the shutter blades, a retarding mechanism for the operating mechanism comprising a pivotally mounted retarding device having a zigzag way thereon, an oscillatory pressure receiving device having a portion operating in said zigzag way, and a portion cooperating with the shutter operating mechanism to be moved by the latter in one direction, a spring for moving said oscillatory pressure receiving device in the other direction, and means for varying the relation between the oscillatory pressure receiving device and the shutter operating mechanism to vary the duration of the retarding mechanism.

5. In a photographic shutter, shutter blades, an operating mechanism for the shutter blades, a retarding mechanism arranged for cooperation with the operating mechanism comprising a movably mounted retarding device having a zigzag way thereon, a movable pressure receiving device having a portion movable in said zigzag way and a portion arranged to receive pressure from the operating mechanism, and means for varying the relation of said pressure receiving device to said operating mechanism for the purpose of varying the retarding action of the retarding mechanism.

RUDOLPH KLEIN.